United States Patent
Blei et al.

(10) Patent No.: US 9,242,289 B2
(45) Date of Patent: Jan. 26, 2016

(54) ARRANGEMENT AND METHOD FOR MANUFACTURING CAN LIDS

(75) Inventors: Klaus Blei, Wangen (DE); Markus Röver, Stuttgart (DE)

(73) Assignee: SCHULER PRESSEN GMBH, Göppingen (DE)

( * ) Notice: Subject to any disclaimer, the term of this patent is extended or adjusted under 35 U.S.C. 154(b) by 1148 days.

(21) Appl. No.: 13/200,744

(22) Filed: Sep. 29, 2011

(65) Prior Publication Data

US 2012/0082529 A1    Apr. 5, 2012

(30) Foreign Application Priority Data

Oct. 4, 2010  (DE) .......................... 10 2010 037 951

(51) Int. Cl.
| | |
|---|---|
| *B21D 51/38* | (2006.01) |
| *B21D 51/44* | (2006.01) |
| *B23K 26/00* | (2014.01) |
| *B65D 17/00* | (2006.01) |

(52) U.S. Cl.
CPC ............ *B21D 51/383* (2013.01); *B21D 51/443* (2013.01); *B23K 26/0093* (2013.01); *B23K 26/364* (2015.10); *B65D 17/24* (2013.01); *B23K 2201/125* (2013.01)

(58) Field of Classification Search
CPC ...... B21D 51/44; B21D 51/443; B21D 51/38; B21D 51/383; B21D 51/40; B21D 43/02; B21D 43/05; B21D 43/28; B21K 26/0093; B65D 17/24; B23K 26/364; B23K 2201/125
See application file for complete search history.

(56) References Cited

U.S. PATENT DOCUMENTS

| | | | | |
|---|---|---|---|---|
| 4,166,424 A | * | 9/1979 | Hahn et al. ..................... | 413/49 |
| 4,890,759 A | * | 1/1990 | Scanga et al. ................ | 220/273 |
| 6,064,034 A | * | 5/2000 | Rieck ...................... | 219/121.85 |
| 6,593,541 B1 | * | 7/2003 | Herren ................... | 219/121.67 |
| 6,775,888 B1 | * | 8/2004 | Wegener et al. ............... | 72/340 |
| 2006/0151501 A1 | * | 7/2006 | Chang et al. .............. | 220/257.2 |

FOREIGN PATENT DOCUMENTS

| | | |
|---|---|---|
| DE | 1 757 001 A | 1/1972 |
| DE | 691 01 477 T2 | 3/1994 |
| DE | 198 05 837 C1 | 7/1999 |
| JP | 11115936 A  *  4/1999 | ............ B65D 17/28 |

* cited by examiner

*Primary Examiner* — Shelley Self
*Assistant Examiner* — Pradeep C Battula
(74) *Attorney, Agent, or Firm* — R. S. Lombard; K. Bach

(57) ABSTRACT

In a method according to the invention for the manufacture of tear notches (22) in can lids (11), the can lid (11) is subjected in the press tool (10) to a laser engraving during which the desired tear notch (22) is generated. The laser ablation process occurs preferably, with the press tool (10) closed, within a time period of less than 30 ms. During this time, the focal spot (27) of the laser beam (26) is moved over the whole desired contour of the tear notch (22) so that an uninterrupted groove-like cavity is formed. With the use of laser engraving in the press tool, the mechanical wear of the press tool and of the press molds can be minimized and in this way the tool operating life can be increased. In particular, the manufacture of can lids with consistently high quality is ensured.

14 Claims, 6 Drawing Sheets

US 9,242,289 B2

ARRANGEMENT AND METHOD FOR MANUFACTURING CAN LIDS

CROSS-REFERENCE TO RELATED APPLICATION

This application claims the priority of German Application No. 10 2010 037 951.4-14 filed Oct. 4, 2010.

BACKGROUND OF THE INVENTION

The invention resides in an arrangement and a method for the manufacture of can covers, in particular beverage can lids. Typically beverage cans and also other food cans are covered at their top by a lid which can easily be ripped open by hand along a tear notch. The tear notch is formed during the manufacture of the can lid by material displacement, for example, during a stamping step. The respective tear notch has still a strength sufficient to safely prevent unintended opening of the lid. On the other hand, a local tension concentration is generated when a butt strap attached to the lid is lifted and the lid is pulled away thereby. The tear notch forms a desired breaking path along which the lid can be opened with a relatively low force.

The stamping of tear notches in can lids requires high-quality tools which are provided with highly precise sharp ribs formed thereon for the stamping of the tear notch. The rib, however, has a limited operating life. With increasing wear of the stamping rib the quality of the stamping rib deteriorates and so does the quality of the tear notch of the can lid manufactured thereby until it becomes unacceptable.

It is the object of the invention to provide an improved method for manufacture of can lids as well as a suitable arrangement for performing the method.

SUMMARY OF THE INVENTION

The object is solved by a method according to claim 1 and a stamping tool according to claim 8. The method according to the invention is for the manufacture of tear notches (22) in can lids (11), the can lid (11) is subjected in the press tool (10) to a laser engraving during which the desired tear notch (22) is generated. The laser ablation process occurs preferably, with the press tool (10) closed, within a time period of less than 30 ms (milliseconds). During this time, the focal spot (27) of the laser beam (26) is moved over the whole desired contour of the tear notch (22) so that an uninterrupted groove-like cavity is formed. With the use of laser engraving in the press tool, the mechanical wear of the press tool and of the press molds can be minimized and in this way the tool operating life can be increased. In particular, the manufacture of can lids with consistently high quality is ensured.

The method according to the invention provides a forming tool which includes two tool parts between which an unfinished workpiece, for example, a metal sheet or a metal strip is transformed into can lids. One of the tool parts may be stationary while the other tool part is moved, for example, back and forth. Preferably the forming tool is a stepping tool which performs the required plastic deformation of the unfinished workpiece to form a can lid in several operating steps. The workpiece is moved through the tool in several steps or stages. The tool includes at least one point, a reception area for the workpiece, that is, the can lid, in which a laser beam is moved along the contour of the tear notch to be formed. The tear notch is accordingly formed by laser engraving which is preferably done with the forming tool closed.

With the forming of the tear notch as a laser engraving the quality of the can lids formed and particularly of the tear notch remains uniform independently of the number of can lids already produced earlier. The tool wear which, because of the wear of the relatively sensitive stamping rib for the forming of the tear notch is normally determined by the stamping rib, and is therefore reduced.

The manufacture of the tear notch in the form of a laser engraving reduces also the stress of the stamping tool. While the conventional manufacture of the tear notch during the stamping procedure requires a high press load at the lower dead center, the laser engraving occurs without any load on the press. This tool no longer needs to move during the stamping step against a fixed stop, that is a solid wall. The bearing loads of the press and the elastic press deformation are reduced and the operating smoothness is improved. Presses may be used which are designed for much lower maximum forces.

The laser engraving of the tear notch occurs preferably in the form of a line engraving wherein the focus spot or focal point of the laser beam is moved along the contour which is predetermined by a tear line for the opening of the can lid. The time required for the engraving of, for example, 10-30 ms (milliseconds) can be made available during a rest phase of the tool, that is, during a period in which the two tool parts are seated on one another and the tool is closed.

In principle, the laser head required for the laser engraving may be arranged in the movable tool part which is generally called the upper tool or in the stationary tool part which is called the lower tool. As a result, the tear the tear notch can be formed, if desired, at the outside of the can lid. Alternatively, the tear notch can be formed at the inside of the can lid. A plastic coating applied later to the inside surface may fill the laser-engraved tear notch which however does not affect the function thereof.

Whereas a stamped tear notch is formed by a displacement of material, the laser engraved tear notch is formed by material removal. With a predetermined control of the heat input and, possibly, a predetermined cooling by a gas or air jet applied to the laser treatment side or to the side opposite the laser treatment of the can lid, the material structure along the tear notch may be changed in addition to the material removal. The structural change can be so controlled that the hardness of the can material in the tear notch area is increased whereby, on one hand, higher rigidity but also an increased brittleness is obtained which improves the tearing capability.

With a suitable handling of the laser beam the cross-sectional shape of the tear notch can be formed as desired. Preferably the notch has the cross-sectional shape of a triangular groove. Preferably this groove has a (concavely) curved bottom. In addition, the flanks of the tear notch have preferably (convexly) rounded top edges at the transitions to the flat can lid side. For influencing the cross-sectional shape of the tear notch, the focusing of the laser beam can be controlled. For example, the rise of the focus spot can be oscillated during the engraving procedure. Also, the position of the laser focus may be varied, for example, oscillated along the direction of the laser beam. The laser beam may also be moved in an oscillating fashion transverse to the longitudinal direction of the tear notch. It is also possible to obtain the material removal during the formation of the tear notch in a single step or in several steps by a multi-layer material removal procedure.

It is considered to be expedient to design the forming station of the tool in which the laser engraving occurs in such a way that the material of the lid is firmly engaged in the proximity of the tear notch to be generated between corresponding pressure surfaces of the tool. In this way, the position of the can lid with regard to the direction of the laser beam is accurately fixed. The laser beam can therefore operate with a short focus range. In addition, it is possible with the precise positioning of the lid to form the tear notch with the desired cross-sectional shape, in particular with rounded flanks. In particular if the tear notch is disposed on the outside of the can lid sharp edges of the tear notch facing the later user of the can are generally avoided.

The press tool according to the invention includes a laser head which includes means for moving the laser focus spot along the contour of the tear line to be generated upon opening of the can lid. The operation of the laser head is synchronized with the opening and closing of the press tool. Preferably, the synchronization is so selected that the means (drive) by which the laser focus spot is moved along the desired contour is operating only when the press tool is at rest. In connection with presses and press tools which run particularly fast, for example, a resiliently supported lever or holder may be provided which, at the engraving stage, contacts the can lid already before the lower dead center is reached by the movable press part and which holds the can lid in engagement with the stationary tool part already while the press plunger is still moving. Such an arrangement gains some time for performing the laser engraving.

It is also possible to leave the respective tool stage in which the can lid is subjected to the laser engraving procedure open. In this case, the can lid is placed by the workpiece transport arrangement only into a reception area of the lower tool port. The laser engraving can then take place while the plunger completed its stroke.

If the laser head is arranged in the movable tool part, the laser beam is preferably directed into the laser head by way of a mirror arrangement which establishes the connection to the laser source arranged outside the press tool. The mirrored laser beam path extends preferably parallel to the direction of movement of the tool part.

If the laser head is arranged in the stationary tool part various means for introducing the laser beam into the laser head may be used, in particular, also fiber optical means. As lasers, $CO_2$ (carbon dioxide) lasers, YAG (yttrium aluminum garnet) lasers or fiber optical lasers may be used.

BRIEF DESCRIPTION OF THE DRAWINGS

Further particulars of advantageous embodiments of the invention are apparent from the drawings, in which it is shown in.

DETAILED DESCRIPTION OF VARIOUS EMBODIMENTS

Figure 1:
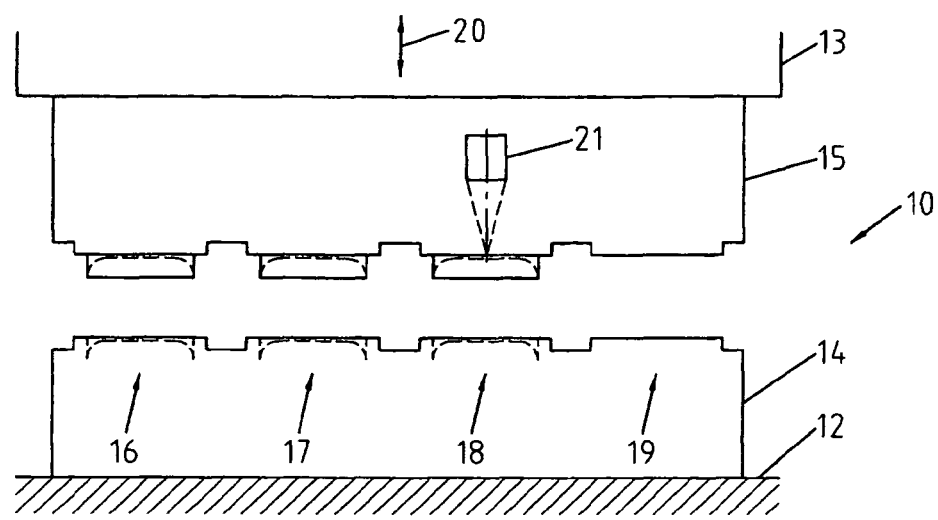
FIG. 1, a press tool in a highly schematic representation.
Figure 3:
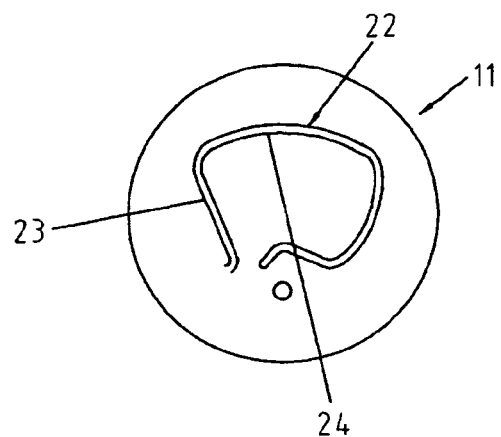
FIG. 3, a can lid with an engraving in a schematic top view.
Figure 5:
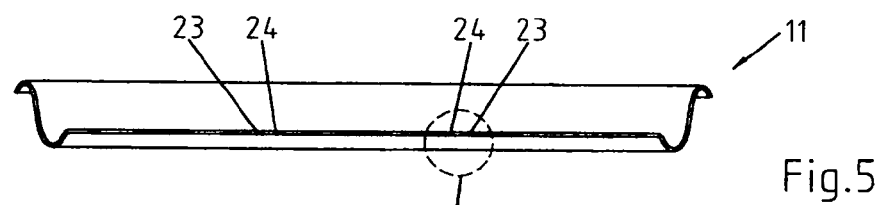
FIG. 5, the can lid in a vertical sectional view,
FIG. 6, a detail of a can lid according to FIG. 5 after the formation of the tear notch.
Figure 7:
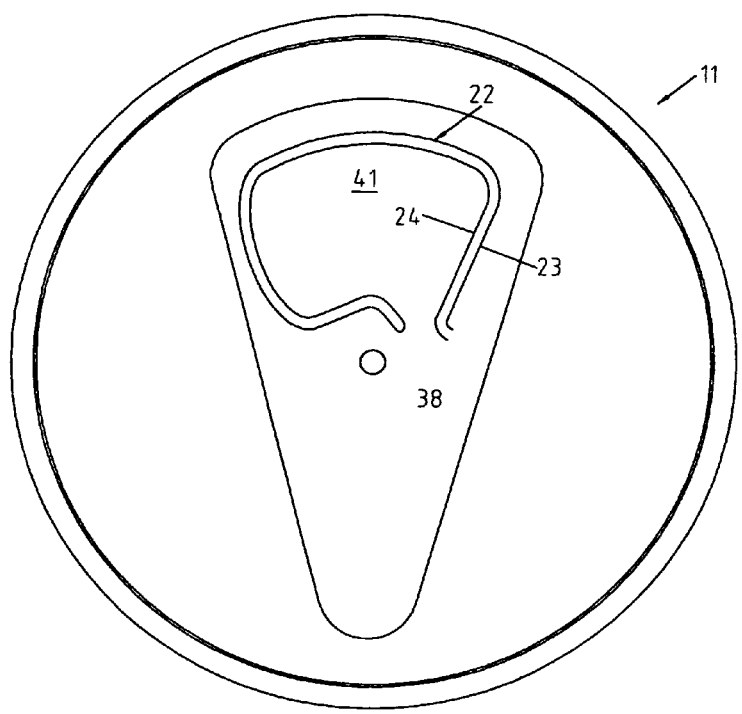
FIG. 7, a schematic top view of the can lid according to FIG. 5.

FIG. 1 shows a press tool 10 for the manufacture of can lids 11 of which one is shown schematically, for example, in FIG. 3. The press or deformation tool 10 is arranged, for example, in a press between a press table 12 and a plunger 13. It comprises a first or lower tool part 14 as well as a second or upper tool part 15. The press tool 10 is preferably a stepping tool with several forming stages 16, 17, 18, 19. These tool stages are provided for different forming operations which are required to form from a planar metal sheet the desired can lid 11 as it is shown, for example, in FIGS. 5 and 7 in vertical sectional view or respectively in a top view. FIGS. 3, 5 and 7 show each an exemplary embodiment of a lid of a beverage can, however, also other can lids as, for example, for canned fish cans can be manufactured according to the invention in the press tool 11.

In the individual tool stages 16-19 in the lower tool part 14 and in the upper tool part 15 respective complementary molds are provided so as to be moved during movement of the plunger 13 in a direction as indicated by the arrow 20 toward the lower tool part 14 or away therefrom for initiating the desired deforming operations.

One of the tool stages, in the present case the stage 18, includes a laser head 21 for forming a tear notch 22 into the can lid 11. The tear notch 22 includes at least one, preferably however two, tear lines 23, 24 which extend in parallel relationship and curved in sections and which are manufactured in the form of laser notches. They can be manufactured in one step continuously as a single line or they may have ends which are not jointed, that is, they are separately formed. For the manufacture of the tear notch 22, the laser head 21 shown in the exemplary embodiment of FIG. 1 in the upper tool 15 is provided. It comprises means 25 which are installed so as to direct the laser beam 26 along the desired contour for forming the tear notch 22. The laser beam 26 is focused onto a focal spot or focal point 27 which is concentrated on the can lid 11.

Figure 4:
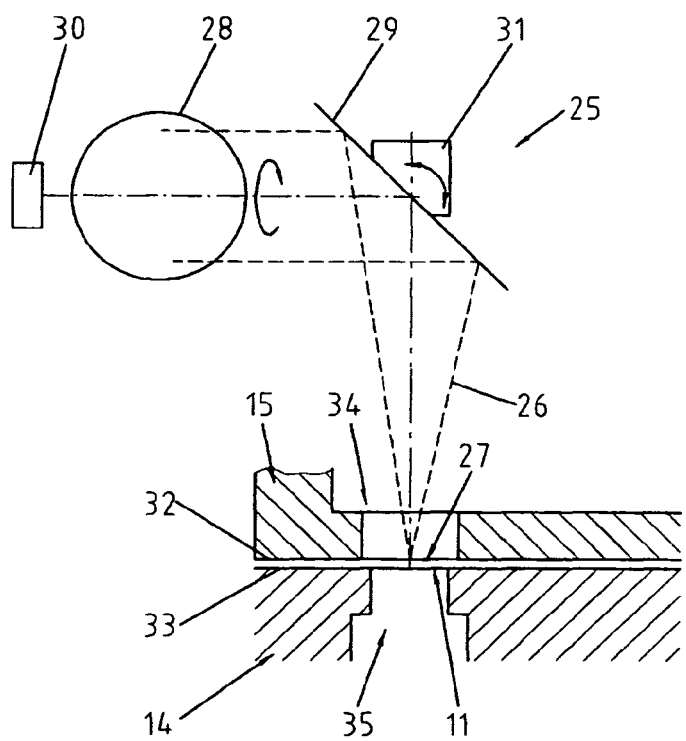
FIG. 4, a section of a laser head and a tool during an engraving procedure in a schematic representation.

As shown in FIG. 4, the means 25 includes one or several mirrors 28, 29 which are supported so as to be pivotable in each case about an axis. For pivoting the respective mirror 28, 29 a respective control drive 30, 31 is provided. The axes of rotation of the two mirrors extend transverse to each other. Furthermore, beam focusing means such as stationary or movable lenses may be provided which, however, are not shown herein.

FIG. 4 shows a section of the press tool 10 in the operating stage 18. The lower tool 14 and the upper tool 15 each have engagement surfaces 32, 33 between which the can lid 14 is fixedly engaged when the press tool is closed. At least the tool which includes the laser head 21, in the present exemplary embodiment: the upper tool includes an opening 34 which is wider than the desired tear notch 22 and which follows the contour thereof. The opening 34 provides for access of the laser beam to the can lid 11 while the can lid is firmly engaged between the engagement or clamping surfaces 32, 33.

Optionally also the lower tool part may be provided with a similar opening 35 which may be used for cooling the can lid in a controlled manner, for example, by a liquid jet or a gas jet.

Figure 2:
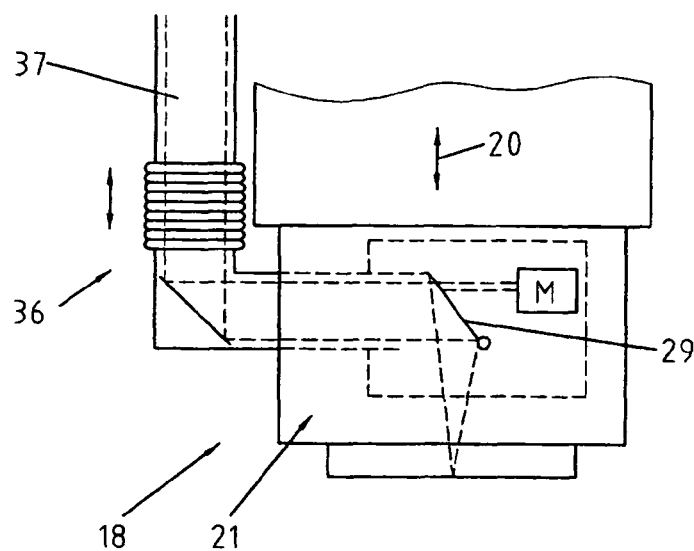
FIG. 2, the upper part of the press tool according to FIG. 1 in a schematic front view.

FIG. 2 shows schematically how the laser beam is supplied to the laser head 21. In the shown exemplary embodiment, this is done via a mirrored beam path 36 which includes a light path stretch 37 of variable length which path extends parallel to the direction of movement of the plunger 13 as indicated by the arrow 20.

A respective unfinished product or blank, for example, in the form of a planar metal sheet or another preformed product is supplied to the press tool 10. Transfer means which are not shown are provided for moving the workpiece, that is the can lid being formed, from working stages 16, 17, 18 to the subsequent working stages 17, 18, 19, etc. at a certain rhythm. The transport rhythm opens and closes the press tool 10 by moving the upper tool part 15 in each case toward the lower tool part 14 and away therefrom.

In the forming stage 16, for example, the blank is pre-shaped. In the forming stage 17, the structure for applying a central rivet 38 (see FIG. 7) is formed whereas in the machining stage 18 the tear notch 22 is formed. The central rivet 38 is for attaching a butt strap or similar member, not shown. To this end, the focal point 27 of the laser beam 26 is directed via the mirrors 28, 29 over the can cover 11 in such a way that it follows the contour of the desired tear notch. Preferably it is moved along the tear lines 23, 24 one after the other. The tear notch 22 formed thereby may be formed as a double line as shown or alternatively as a single line. It forms a local narrow groove which establishes a desired tear line.

Figure 6:
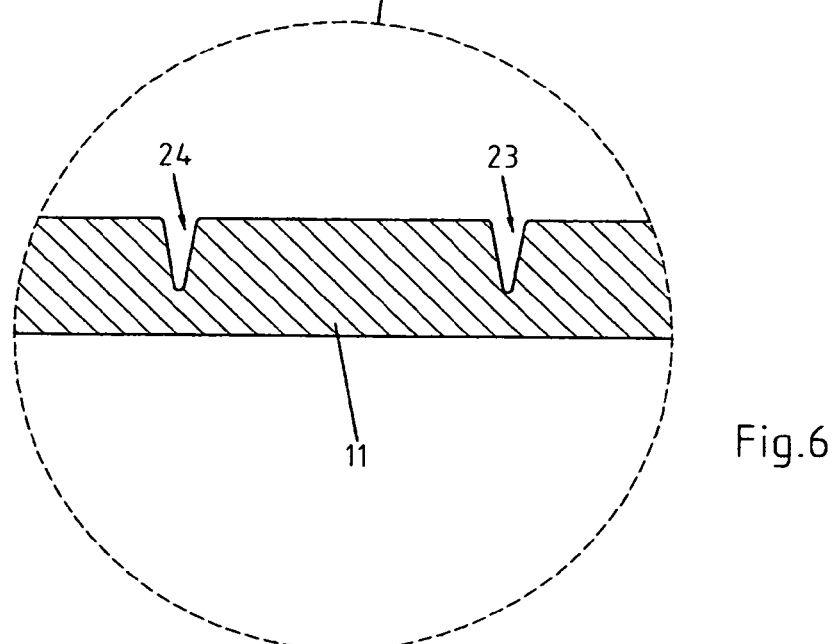
Figure 8:
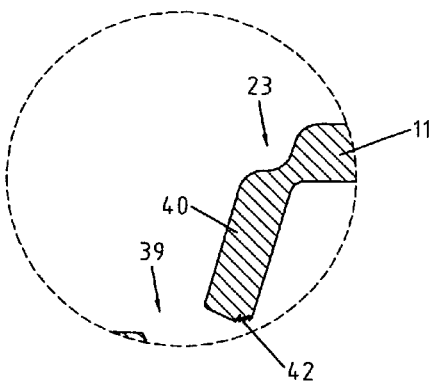
FIG. 8, in a schematic representation tear lines obtained from the tear notches during opening of the can lid.

FIG. 6 shows the two tear lines 23, 24 of the tear notch 22 in the normal state. If the part of the can lid surrounded by tear notch 22 is pushed inwardly by an opener, the can lid 11 tears along at least one of the lines 23, 24 so that a crack line 39 is formed. Preferably in the process a narrow strip 40 of the can lid 11 is thereby pulled inwardly by the part 41 of the can lid surrounded by the tear notch 22 as it is shown in FIG. 8. The section 40 angled inwardly into the can interior depends from the outer line 23 and forms for the user a rounded edge that is not sharp so that the user can drink directly from the can. The possibly sharp-edge tear or break off edge 42 which has been formed along the tear line extends inwardly into the can interior.

With manufacture of the tear notch 22 by a laser ablation procedure, the material of the can lid 11 may experience a structural change which results in a hardening of the material and a certain brittleness. If this is desired, for example, to facilitate tearing the can lid open, the process parameters can be adjusted by focusing the beam, by the laser treatment duration and by the laser beam guidance, that is the speed of movement of the focal point 27, and possibly an additional cooling of the can lid 11. The material of the can lid can be thermally hardened in the area of the tear notch 22.

Figure 9:
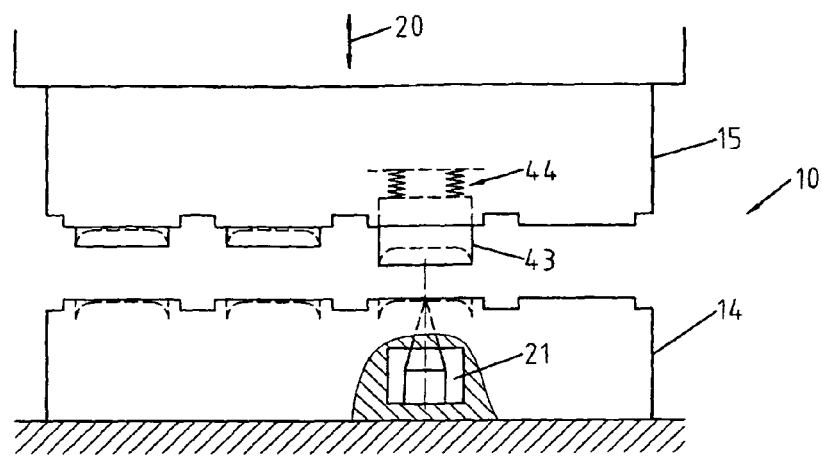
FIG. 9, a modified press tool for the manufacture of can lids in a schematic representation.

FIG. 9 shows a modified embodiment of the press tool 10. In this press tool 10, the laser head 21 is arranged in the lower tool part 14. The working stage 18 may be rigidly formed on the upper tool part or, as shown in FIG. 9 symbolically, via a resiliently supported tool holder 43. This can be seated on the lower tool 14 or respectively a can lid disposed on the lower tool 14 before the press tool 10 is fully closed and is then supported on the upper tool by spring means 44. As soon as the tool holder is seated on the can lid the can lid is safely at rest, so that the desired laser engraving can be performed by the laser head 21, that is that the tear notch 22 can be formed. The time available herefor is increased by the movable support for the tool holder 43 over the actual closing time during which the press tool is fully closed. In this way, the laser machining of the can lid is possible also with rapidly running presses even if relatively large tear notches 22 are to be formed. Alternatively, an upper tool part may be omitted in the working stage 18 so that the can lid is available for laser machining for the full workpiece time between two transfer steps as long as the tool is at rest.

Figures 10, 11:
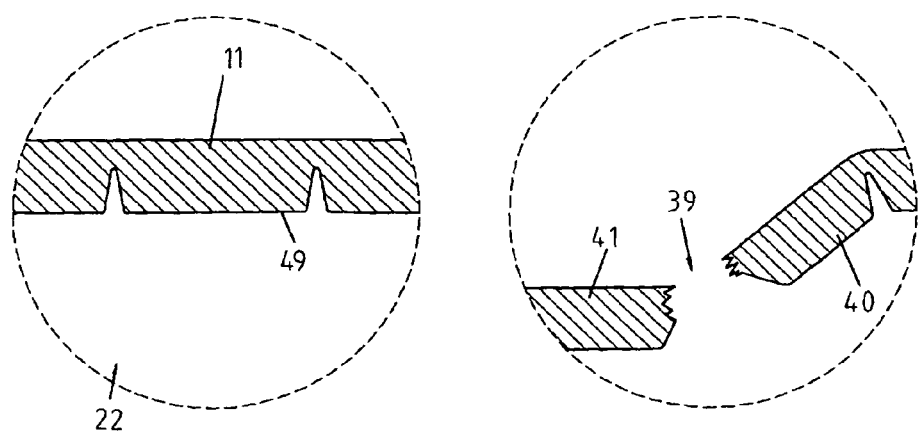
FIG. 10, a detail of a can lid manufactured with a tool as shown in FIG. 9 in an enlarged vertical cross-sectional representation.
FIG. 11, the lid section of FIG. 10 upon opening of the lid,
FIG. 12, the manufacture of a can lid with a laser-engraved tear notch and an opposite groove during manufacture,
FIG. 13, the can lid shown in FIG. 12 during manufacture ripped apart for opening the lid.

If the tear notch 22 is cut by the laser head arranged in the lower tool 14, the tear notch 22 is formed at the inside surface 49 of the can lid 11 which later faces the can interior. This is shown in FIG. 10. FIG. 11 shows the area of the can lid 11 during opening. Again the section 40 is ripped open at the line next to the area 41. The fracture line 39 formed thereby however may have sharp edges, but it is bent downwardly facing the interior of the can and therefore represents no danger of injuring a user.

Figure 12:
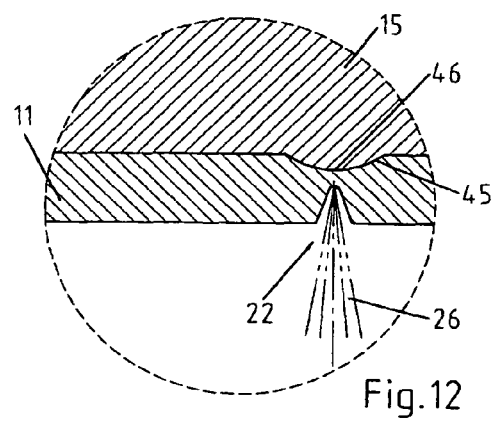
Figure 13:
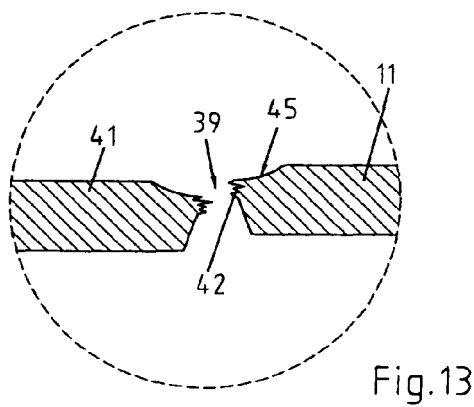

It is also possible to combine the manufacture of the tear notch 22 by laser beam 26 with the stamping of a groove 45 at the other side of the can lid 11, as it is indicated in FIG. 12. There, one of the tool parts 14, 15, for example, the upper tool part 15 is provided with a stamping rib 46 which follows the contour of the tear notch 22. It differs however from stamping rib as used earlier for the manufacture of the tear notch, that is, it is less sharp-edged, but rather softly rounded. As a result, the wear at this stamping rib is negligibly small. But it results in a material displacement forming a recess 45 which will lead to a local solidifying of the lid 11 material if this is desired. In addition, the recess 45 will move the sharp break-off edge 42 away from the outer surface of the can lid 11 as shown in FIG. 13. This may be important if the break-off line not in the form of a double line, but is a single line.

Figure 14:
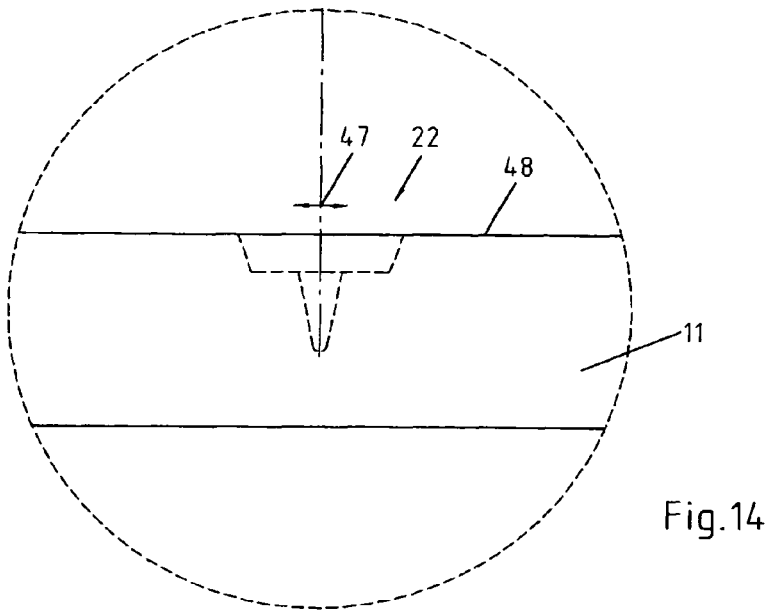
FIG. 14, a sectional view of the can lid including a tear notch with a double contour.

Further method refinements are possible. For example, the laser ablation method for the manufacture of the tear notch 22 can be so controlled that a tear notch with a rounded edge is formed. To this end, the laser beam can be moved, in addition to the movement in the longitudinal direction along the desired contour also in a transverse direction as indicated in FIG. 14 by the arrow 47. In addition or alternatively a changing beam focusing may be utilized, for example, by oscillating or changing the focus of the laser beam during the ablation procedure rapidly and constantly between two different values. This and other measures such as the use of an objective with a particularly short focus may be used to provide for a tear notch which later provides for break-off edges which are not sharp-edged at the top side 48 facing the user.

In a method according to the invention for the manufacture of tear notches 22 on can lids 11, the can lid 11 is subjected to the press tool to a laser engraving by which the desired tear notch 22 is formed. The laser ablation procedure occurs preferably with the press tool 10 closed within a time period of less than 30 ms (milliseconds). During this time, the focal point 27 of the laser beam 26 is moved over the whole desired contour of the tear notch 22, so that a preferably uninterrupted groove-like recess is formed.

By the use of the laser engraving in the press tool, the mechanical wear of the press tool and press molds can be minimized and, in this way, the tool life can be increased. In particular, the manufacture of can lids of consistently high quality can be ensured.

LISTING OF THE REFERENCE NUMERALS 10 press tool
11 can lid
12 press table
13 press plunger
14 lower tool part
15 upper tool part
16-19 tool stages
20 arrow
21 laser head 22 tear notch
23 line
24 line
25 means
26 laser beam
27 focus point or focal spot
28 first mirror
29 second mirror
30 first control drive
31 second control drive
32 clamping (engagement) surface
33 clamping (engagement) surface
34 opening in the upper tool part
35 opening in the lower tool part
36 mirrored beam path
37 beam travel path
38 rivet
39 tear line
40 section
41 area
42 tear edge
43 tool holder
44 (spring means) resilient means
45 groove
46 stamping rib
47 arrow
48 upper side or outside surface
49 inside surface

What is claimed is:

1. Press tool (10) for the manufacture of a can lid (11) which can be ripped open, comprising:
the press tool (10) is a stage tool including several press stages (16, 17, 18);
a first tool part (14) and a second tool part (15) provided with complementary molds for transforming therebetween a metal sheet or a metal strip into the can lid (11) in one or several operating strokes of the press tool (10), each stroke causing a cooperative opening and closing of the first tool part (14) and the second tool part (15);
a laser head (21) arranged in one of the tool parts (14, 15) set up to generate a laser focal spot (27) of a laser beam (26) on the can lid (11);
the laser beam (26) for forming by laser engraving a tear notch (22) into the can lid (11);
the laser head (21) is arranged in one of the press stages (18) of the stage tool (10) which is not assigned any deforming operation; and,
means (25) for moving the laser focal spot (27) of said laser beam (26) along the contour of the tear notch (22) to be formed into the can lid (11).

2. Press tool (10) according to claim 1, characterized by, the means (25) for moving the laser focal spot (27) comprises at least one mirror (29) which is movable by a drive means (31).

3. Press tool (10) according to claim 1, characterized by, the laser head (21) is arranged in the first tool part (14) which is stationary during press operation.

4. Press tool (10) according to claim 1, characterized by, the laser head (21) is connected, via a mirror beam path (36) to the laser beam (26) which is arranged outside the press tool (10).

5. Press tool (10) according to claim 4, characterized by, the laser head (21) is arranged in the second tool part (15) which is movable and the mirror beam path (36) extends parallel to the direction (20) of movement of the second tool part (15).

6. Press tool (10) according to claim 1, characterized by, one of the first tool part (14) and second tool part (15) is movable, said press tool (10) further including a resiliently supported tool holder (43) for temporarily holding the can lid (11) affixed to and resiliently supported by a spring means (44), the spring means (44) affixed to said one movable first tool part (14) or second tool part (15).

7. Press tool (10) according to claim 1, characterized by, the laser head (21) includes means for adjusting at least one of the focusing of the laser beam (26), the laser treatment duration, the speed of movement of the focal point (27), and the cooling of the can lid (11), whereby the brittleness of the can lid (11) at the tear notch (22) can be adjusted.

8. Press tool (10) for the manufacture of a can lid (11) which can be ripped open, comprising:
a first tool part (14) and a second tool part (15) provided with complementary molds for transforming therebetween a metal sheet or a metal strip into the can lid (11) in one or several operating strokes of the press tool (10), each stroke causing a cooperative opening and closing of the first tool part (14) and the second tool part (15);
a laser head (21) arranged in one of the tool parts (14, 15) set up to generate a laser focal spot (27) of a laser beam (26) on the can lid (11);
the laser beam (26) for forming by laser engraving a tear notch (22) into the can lid (11);
the laser head (21) is in operative synchronization with the cooperative opening and closing of the first tool part (14) and second tool part (15);
means (25) for moving the laser focal spot (27) of said laser beam (26) along the contour of the tear notch (22) to be formed into the can lid (11); and,
the operative synchronization of the laser head (21) is arranged so the means (25) for moving the laser focal spot (27) is operative for moving the laser focal spot (27) along the desired contour of the tear notch (22) only when the press tool (10) is at rest.

9. Press tool (10) according to claim 8, characterized by, the means (25) for moving the laser focal spot (27) comprises at least one mirror (29) which is movable by a drive means (31).

10. Press tool (10) according to claim 8, characterized by, the laser head (21) is arranged in the first tool part (14) which is stationary during press operation.

11. Press tool (10) according to claim 8, characterized by, the laser head (21) is connected, via a mirror beam path (36) to the laser beam (26) which is arranged outside the press tool (10).

12. Press tool (10) according to claim 11, characterized by, the laser head (21) is arranged in the second tool part (15) which is movable and the mirror beam path (36) extends parallel to the direction (20) of movement of the second tool part (15).

13. Press tool (10) according to claim 8, characterized by, one of the first tool part (14) and the second tool part (15) includes a stamping rib (46) which follows the contour of tear notch (22) to form a recess (45) in the can lid (11).

14. Press tool (10) according to claim 8, characterized by, the laser head (21) includes means for adjusting at least one of the focusing of the laser beam (26), the laser treatment duration, the speed of movement of the focal point (27), and the cooling of the can lid (11), whereby the brittleness of the can lid (11) at the tear notch (22) can be adjusted.

* * * * *